United States Patent
Kopp et al.

(10) Patent No.: US 11,757,150 B2
(45) Date of Patent: Sep. 12, 2023

(54) BATTERY MODULE HAVING ELECTRICALLY RESISTIVE HEATING ELEMENT INCLUDING ELECTRICALLY RESISTIVE HEATING WIRE

(71) Applicant: Robert Bosch GmbH, Stuttgart (DE)

(72) Inventors: Benjamin Kopp, Remseck am Neckar (DE); Christian Loew, Stuttgart (DE); Roman Marx, Moensheim (DE); Markus Schmitt, Tamm (DE); Matthias Oechsle, Ditzingen-Hirschlanden (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 17/400,225

(22) Filed: Aug. 12, 2021

(65) Prior Publication Data
US 2022/0052397 A1    Feb. 17, 2022

(30) Foreign Application Priority Data

Aug. 13, 2020   (DE) ..................... 10 2020 210 306.2

(51) Int. Cl.
*H01M 10/6571* (2014.01)
*H01M 10/615* (2014.01)
(Continued)

(52) U.S. Cl.
CPC ..... *H01M 10/6571* (2015.04); *H01M 10/615* (2015.04); *H01M 10/625* (2015.04);
(Continued)

(58) Field of Classification Search
CPC .......... H01M 10/6571; H01M 10/615; H01M 10/625; H01M 10/647; H01M 50/209
See application file for complete search history.

(56) References Cited

U.S. PATENT DOCUMENTS

| | | | | |
|---|---|---|---|---|
| 2008/0213652 A1* | 9/2008 | Scheucher | .......... | H01M 10/482 429/97 |
| 2012/0009455 A1* | 1/2012 | Yoon | ................. | H01M 10/6555 429/120 |
| 2016/0190666 A1* | 6/2016 | Hoshino | ............... | H01M 50/20 429/120 |

FOREIGN PATENT DOCUMENTS

| | | | | |
|---|---|---|---|---|
| CN | 107146860 A | * | 9/2017 | .......... H01M 10/486 |
| CN | 110518310 A | | 11/2019 | |

(Continued)

OTHER PUBLICATIONS

Wikipedia, "Elektrischer Widerstand", <https://de.wikipedia.org/wiki/Elektrischer_Widerstand>, 2003, 23 pages including machine translation.

*Primary Examiner* — Jimmy Vo
(74) *Attorney, Agent, or Firm* — Michael Best & Friedrich LLP

(57) ABSTRACT

A battery module having a multiplicity of battery cells in thermally conductive contact with an electrical resistive heating element that comprises an electrical resistive heating wire, wherein a first area of the heating element comprises an electrical resistive heating wire with a first cross section, which is in thermally conductive contact with a first outer surface region of battery cells, and wherein a second area of the heating element, which has a resistive heating wire with a second cross section different from the first cross section, is in thermally conductive contact with a second outer surface region of battery cells, and/or wherein the resistive heating element has a first area with a first laying density of electrical resistive heating wire that is in thermally conductive contact with first outer surface regions of battery cells and comprises a second area that has a second laying density, different from the first laying density, of the elec- (Continued)

trical resistive heating wire and is in thermally conductive contact with second outer surface regions of battery cells.

13 Claims, 3 Drawing Sheets

(51) Int. Cl.
*H01M 10/647* (2014.01)
*H01M 50/209* (2021.01)
*H01M 10/625* (2014.01)

(52) U.S. Cl.
CPC ....... *H01M 10/647* (2015.04); *H01M 50/209* (2021.01); *H01M 2220/20* (2013.01)

(56) References Cited

FOREIGN PATENT DOCUMENTS

| | | | | |
|---|---|---|---|---|
| DE | 1671855 | A | 3/1972 | |
| DE | 102011015152 | A1 | 9/2012 | |
| DE | 102011104000 | A1 | 12/2012 | |
| DE | 102014105764 | A1 | 10/2015 | |
| DE | 102015010925 | A1 | 3/2016 | |
| KR | 20170119526 | A * | 10/2017 | .......... H01M 10/635 |
| WO | 2015035406 | A1 | 3/2015 | |
| WO | 2017096463 | A1 | 6/2017 | |

* cited by examiner

BATTERY MODULE HAVING ELECTRICALLY RESISTIVE HEATING ELEMENT INCLUDING ELECTRICALLY RESISTIVE HEATING WIRE

BACKGROUND OF THE INVENTION

The present invention relates to a battery module, to a method for operating same and to the use thereof.

Conventional batteries in the field of electromobility comprise a multiplicity of battery cells that are for example grouped together to form a cell stack and are electrically interconnected with one another. Such cell stacks are finally introduced into an appropriate battery housing. Owing to electrochemical conversion processes within the battery cells, lithium-ion and lithium-polymer battery cells, especially in the case of a rapid energy output or intake, in particular heat up to a great extent in battery systems. The more powerful a battery pack formed from the battery cells, the greater the corresponding release of heat and the greater the requirement for an efficient active thermal management system.

Besides efficient cooling of the battery cells, the possibility of being able to heat cells, in particular at low temperatures of below 10° C., is however also becoming of increasing importance, since said cells are not necessarily able to be charged at these temperatures, as otherwise there is the risk of what is known as lithium plating. If the intention is to guarantee full energy intake of the battery cells, this requires active heating of the battery cells in order to bring the battery cells to a sufficiently high temperature level.

The temperature of battery cells is nowadays usually controlled by fluid temperature control involving conventional water/glycol mixtures. In this case, an appropriate fluid is routed through channels of a cooling element, arranged for example underneath the stack of battery cells. This cooling element is part of a corresponding cooling circuit.

In this regard, DE 10 2015 010 925 A1 and DE 10 2011 104 000 A1 disclose providing batteries with a cell connector unit and/or a cell voltage tapping unit that comprises a temperature control unit or is in thermally conductive contact with such a unit.

WO 2015/0035406 furthermore discloses a battery pack in which miniaturized coolant pipes are used to control the temperature of battery cells.

SUMMARY OF THE INVENTION

The invention provides a battery module, a method for operating same and the use thereof.

The battery module according to the invention comprises a multiplicity of battery cells, these being for example lithium-ion battery cells or lithium-polymer battery cells. The battery module furthermore comprises an electrical resistive heating element for controlling the temperature of the battery cells. The electrical resistive heating element comprises an electrical resistive heating wire that heats the surroundings when flowed through by current. Provision is made for the electrical heating element to comprise a first heating area in which the electrical resistive heating wire has a first cross section and a second heating area in which the electrical resistive heating wire has a second cross section different from the first cross section. Both heating areas of the electrical resistive heating element are in thermally conductive contact with outer surface regions of the battery cells. In addition or as an alternative, the electrical heating element may comprise a first heating area that has a first laying density of the electrical resistive heating wire and a second heating area that has a second laying density, different from the first laying density, of electrical resistive heating wire. Both heating areas are again in thermally conductive contact with outer surface regions of battery cells. A laying density is understood to mean the absolute length of laid electrical resistive heating wire per surface area unit of the heating area. The electrical resistive heating wire is thus for example laid, in a high-laying-density area, with relatively long loops, and thus also a relatively high absolute laid length of the resistive heating wire.

The particular advantage of this measure is that, in the case of a single electrical resistive heating element, a first heating area leads to relatively intensive heating of an outer surface of battery cells in thermal contact therewith in comparison with a second heating area that has a different heating power.

This is based on the finding that a higher laying density of electrical resistive heating wire leads to a higher output thermal energy per surface area unit of the heating area, and that a lower cross section of an electrical resistive heating wire leads to a higher temperature within same, and thus likewise to a higher output of thermal heating power per surface area of the corresponding heating area. Both measures may in this case be implemented as an alternative or in addition.

The particular significance of this kind of heating is based on the fact that battery cells inside a battery module are exposed to different thermal influences. If this is not adequately taken into consideration, then corresponding battery modules or battery packs comprising same are possibly throttled prematurely during operation in the range of low or high temperatures in order to prevent damage to individual cells that are exposed to thermal peak loading. This leads to lower availability of the corresponding battery module or battery pack. It is also known that battery cells that are regularly subjected to thermal loading age prematurely, and battery cells of the corresponding battery module or of a corresponding battery pack are thus exposed to different aging influences.

Advantageous embodiments of the invention are the subject of the dependent claims.

It is thus advantageous for terminally positioned battery cells of a battery cell stack within the battery module to be in thermally conductive contact with a heating area of the electrical resistive heating element that has an increased heating power. This is advantageously achieved through a higher laying density of electrical resistive heating wire or through a reduced cross section thereof. Since terminal battery cells of a battery cell stack are regularly in thermally conductive contact, for example, with a housing of the battery module, they lose heat to a particularly great extent and, at cold operating temperatures, are at a colder temperature level than comparable battery cells in the inside of the battery cell stack.

It is also advantageous for the electrical resistive heating element to be adhesively bonded to outer surfaces of the battery cell housing of the multiplicity of battery cells. The advantage of this measure is that of simple and effective fastening of the electrical resistive heating element to the surface of at least one battery cell. The layer thickness of the application of adhesive may furthermore be used to equalize possible manufacturing tolerances of the battery cell stack.

According to a further advantageous embodiment of the present invention, the battery cells of the battery module are arranged in the form of a battery cell stack, wherein the battery cells of the battery cell stack are fastened in a positionally fixed manner in relation to one another by way of a tightening belt. The tightening belt of the battery module may in this case be designed as an electrical resistive heating element or comprise same. The advantage of this embodiment is that it is not necessary to provide any additional new component for the battery module, this leading to a particularly space-saving embodiment of the battery module.

The battery module according to the invention is advantageously used in electrically or partially electrically operated vehicles, such as electric battery-operated vehicles, fuel cell-operated vehicles, hybrid or plug-in-hybrid vehicles, and in kitchen appliances or domestic appliances and in stationary storage units for in particular renewably generated electrical energy.

BRIEF DESCRIPTION OF THE DRAWINGS

Advantageous embodiments of the present invention are illustrated in the drawing and described in more detail in the following description of the figures, in which.

DETAILED DESCRIPTION

Figure 1A:
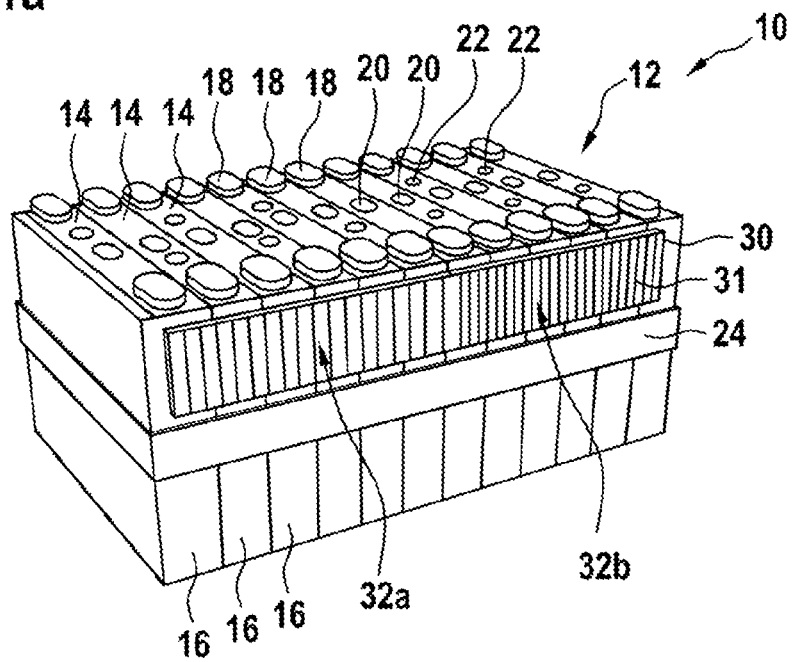
FIGS. 1a to 1d show schematic illustrations of variants of a battery module according to a first embodiment of the present invention and FIG. 2 shows the schematic illustration of a battery module according to a second embodiment of the present invention.

FIGS. 1a to 1d show different variants of a battery module according to a first embodiment of the present invention. The battery module 10, in a housing (not illustrated), comprises a battery cell stack 12 that comprises a multiplicity of battery cells 14. The battery cells 14 have for example a prism-shaped battery cell housing 16 and form the battery cell stack 12, wherein the battery cell housings 16 of the battery cells 14 are each in physical contact with an adjacent battery cell 14 by way of their large surfaces. The battery cells 14 for their part have battery cell terminals 18 on the top surfaces of their battery cell housings 16, as well as for example an expansion opening 20 and an electrolyte insertion opening 22. The prism-shaped battery cell housings 16 each have a side surface that in each case encompasses the vertically arranged boundary surfaces of the battery cell housing 16, as well as a top surface and a bottom surface.

Provision is furthermore made for an electrical resistive heating element 30 for heating the battery cells 14 of the battery cell stack 12. This is for example of flat design and may for example be designed in the form of a heating mat, a flexible printed circuit (FPC) or as a carrier film, comprising a flexible flat cable (FFC).

In order to guarantee the most effective possible heating of the multiplicity of battery cells 14 of the battery cell stack 12, the electrical resistive heating element 30 is installed for example on an outer surface of the battery cell stack 12, in particular in the longitudinal direction thereof. Such a variant of a battery module 10 is illustrated in FIG. 1a.

Figure 1B:
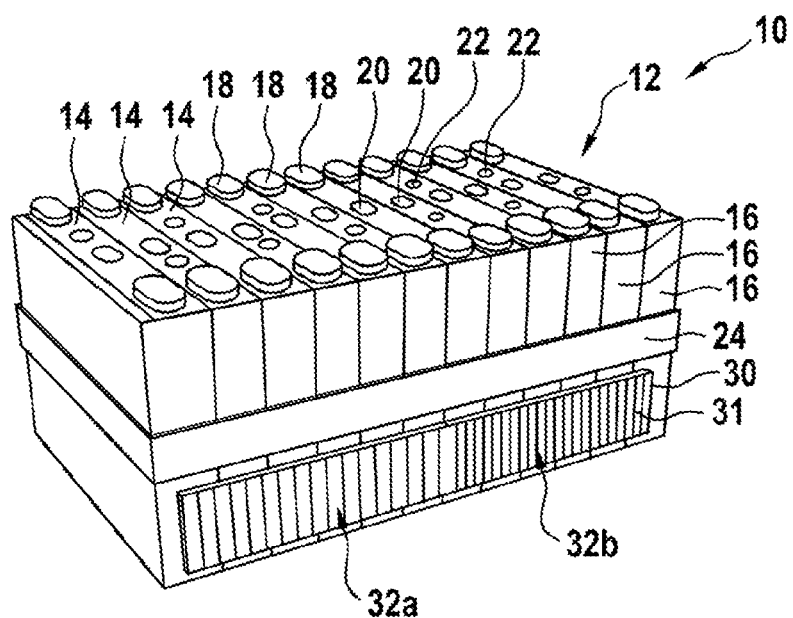

The electrical resistive heating element 30 may in this case be adhesively bonded for example to the battery cell housings 16 of the battery cells 14 of the battery cell stack 12. In this case, the layer thickness of the layer of adhesive is advantageously dimensioned such that manufacturing-induced deviations in the positioning of the battery cells 14 within the battery cell stack 12 are compensated for and the electrical resistive heating element 30 is in thermally conductive contact with the battery cell housings 16 of the battery cells 14 over its entire surface area. A thermally conductive adhesive, for example containing thermally conductive filler particles, is advantageously used as adhesive. The electrical resistive heating element 30 may be arranged for example above a bracing belt 24 of the battery module 10, as illustrated in FIG. 1a, or below the bracing belt 24, as illustrated in FIG. 1b.

The electrical resistive heating element 30 comprises an electrical resistive heating wire 31 that heats the surroundings when flowed through by current. Provision is made for the electrical heating element 30 to comprise a first heating area 32a in which the electrical resistive heating wire 31 has a first cross section and a second heating area 32b in which the electrical resistive heating wire 30 has a second cross section different from the first cross section. Both heating areas 32a, 32b of the electrical resistive heating element 30 are in thermally conductive contact with outer surface regions of the battery cell housings 16. In addition or as an alternative, the electrical heating element 30 may comprise a first heating area 32a that has a first laying density of the electrical resistive heating wire 30 and a second heating area 32b that has a second laying density, different from the first laying density, of electrical resistive heating wire 30. Both heating areas 32a, 32b are again in thermally conductive contact with outer surface regions of the battery cell housings 16.

Figure 1C:
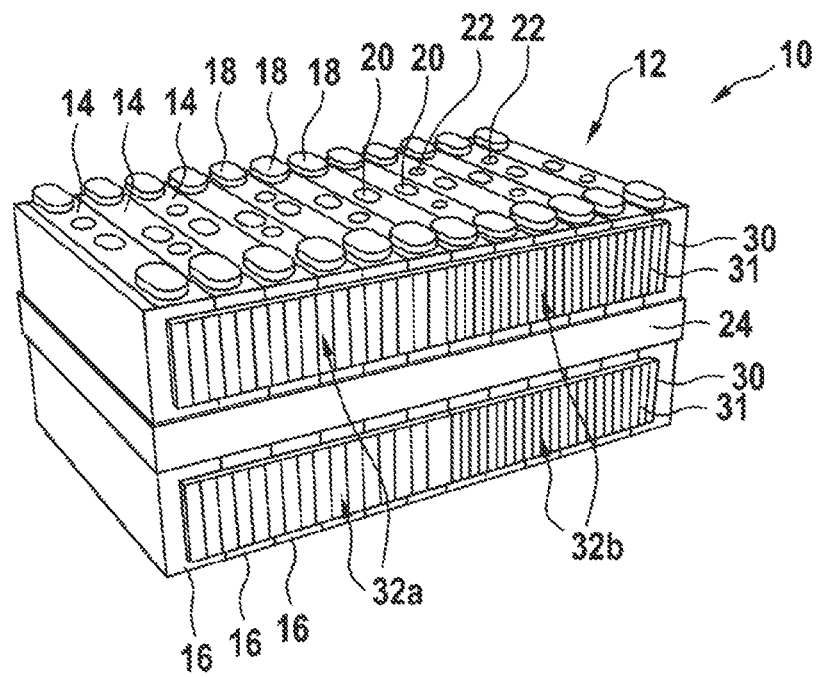

The bracing belt 24 in this case serves to brace the battery cells 14 within the battery cell stack 12 in order to achieve positional fastening of the battery cells 14 within the battery cell stack 12. A further alternative is that of providing two electrical resistive heating elements 30, one being positioned above and one being positioned below the bracing belt 24. Such a variant of the battery module according to the invention is illustrated in FIG. 1c.

Figure 1D:
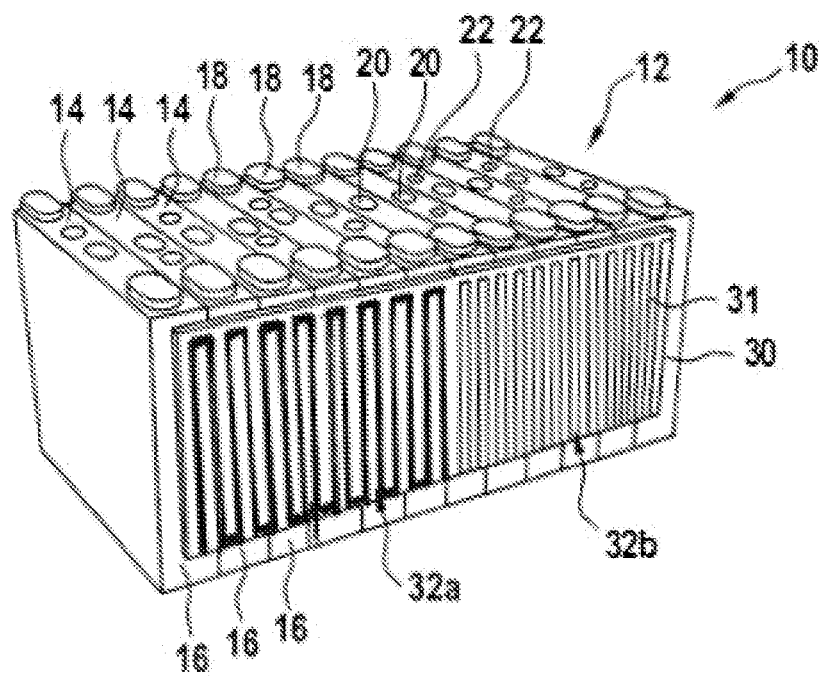

If, owing to the structure of the battery cell stack 12, it is possible to dispense with using a bracing belt 24, then—as illustrated in FIG. 1d—the electrical resistive element may largely or even completely cover a side surface of the battery cell stack 12. As an alternative, it is possible to design the electrical resistive heating elements 30, illustrated by way of example in FIGS. 1a to 1d and at least partially covering only one large surface of the battery cell stack 12, such that they additionally cover end faces of the battery cell stack 12 or furthermore additionally also partially or fully cover a second large surface of the battery cell stack 12. It is thereby possible to effectively prevent the occurrence of thermal stresses within the battery cells 14 of the battery cell stack 12.

A further alternative is that of designing the bracing belt 24 itself as an electrical resistive heating element 30. To this end, this may either itself be designed as an electrical resistive heating element 30 or contain same. To this end, the bracing belt 24 may for example contain electrical resistive conductors that are connected to a suitable external current source.

Figure 2:
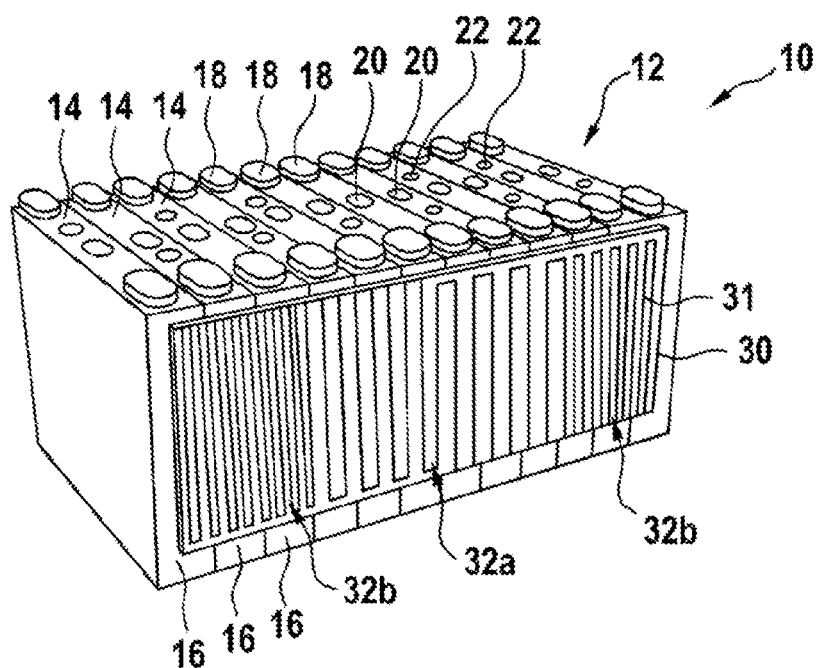

FIG. 2 illustrates a battery module according to a second embodiment of the present invention. The same reference signs denote the same component parts as in FIG. 1.

In this case, the electrical resistive heating element 30 comprises a first heating area 32a that is in thermally conductive contact with the battery cell housings 16 of the battery cells 14 in the middle of the battery cell stack 12. The electrical resistive heating element 30 furthermore comprises two second heating areas 32b that are in thermally conductive contact with the battery cell housings 16 of terminally positioned battery cells 14 of the battery cell stack 12. In this case, the second heating areas 32b have a greater heating power than the first heating area 32a during operation. To this end, the second heating areas 32a, 32b of the electrical resistive heating element 30 have an increased laying density of electrical resistive heating wire 31 or a reduced cross section of the electrical resistive heating wire 31.

Since the terminal battery cells 14 of the battery cell stack 12 are for example in thermally conductive contact with a housing of the battery module 10, they lose heat to a particularly great extent and, at cold operating temperatures, are at a colder temperature level than comparable battery cells 14 in the inside of the battery cell stack 12.

The electrical resistive heating element 30 is in general connected to an external current source or is in current-conducting contact with battery cells 14 of the battery module 10. The battery module 10 furthermore for example has a temperature measurement unit for determining the real temperature within the battery module 10. Provision is furthermore made for a control device (not illustrated) for operating the electrical resistive heating element 30, by way of which control device the electrical resistive heating element 30 is able to be put into operation or else deactivated.

What is claimed is:

1. A battery module having a multiplicity of battery cells, wherein battery cells (14) of the battery module (10) are in thermally conductive contact with an electrical resistive heating element (30) that comprises an electrical resistive heating wire (31), characterized in that a first area (32a) of the electrical resistive heating element (30) comprises an electrical resistive heating wire (31) with a first cross section, which is in thermally conductive contact with a first outer surface region of the battery cells (14), and in that a second area (32b) of the electrical resistive heating element (30), which has an electrical resistive heating wire (31) with a second cross section different from the first cross section, is in thermally conductive contact with a second outer surface region of the battery cells (14).

2. The battery module according to claim 1, characterized in that the multiplicity of battery cells (14) is arranged in the form of a battery cell stack (12) and in that an area (32a, 32b) of the electrical resistive heating element (30) is positioned in the region of at least one battery cell (14) terminally delimiting the battery cell stack (12), which area has a reduced cross section of the electrical resistive heating wire (31).

3. The battery module according to claim 1, characterized in that the electrical resistive heating element (30) is positioned in thermally conductive contact with a bracing device (24) that mechanically braces the battery cells (14) with one another.

4. The battery module according to claim 1, characterized in that the electrical resistive heating element (30) is adhesively bonded to the outer surface of at least one battery cell housing (16) of the multiplicity of battery cells (14).

5. The battery module according to claim 1, characterized in that the multiplicity of battery cells (14) is arranged in the form of a battery cell stack (12), wherein the battery cells (14) of the battery cell stack (12) are positionally fixed in relation to one another by way of a tensioning belt (24), and in that the tensioning belt (24) is an electrical resistive heating element (30) or contains an electrical resistive heating element.

6. The battery module according to claim 1, wherein the multiplicity of battery cells are rechargeable lithium-ion battery cells or lithium-polymer battery cells.

7. The battery module according to claim 1, wherein the resistive heating element (30) has a first area (32a) with a first laying density of electrical resistive heating wire (31) that is in thermally conductive contact with first outer surface regions of the battery cells (14), and comprises a second area (32b) that has a second laying density, different from the first laying density, of the electrical resistive heating wire (31) and is in thermally conductive contact with second outer surface regions of the battery cells (14).

8. A method for heating a battery module, characterized in that, in the battery module (10) according to claim 1, the electrical resistive heating element (30) is activated as soon as a measured real temperature of the battery module (10) drops below a predetermined setpoint temperature of the battery module (10).

9. An apparatus comprising the battery module according to claim 1, wherein the apparatus is an electrically or partially electrically driven vehicle.

10. An apparatus comprising the battery module according to claim 1, wherein the apparatus is an electrically or partially electrically driven aircraft.

11. An apparatus comprising the battery module according to claim 1, wherein the apparatus is an electrical kitchen or domestic appliance.

12. An apparatus comprising the battery module according to claim 1, wherein the apparatus is a stationary storage unit for storing renewably generated electrical energy.

13. The battery module according to claim 1 comprising a means for heating the battery module, wherein the means is configured to activate the resistive heating element (30) as soon as a measured real temperature of the battery module (10) drops below a predetermined setpoint temperature of the battery module (10).

* * * * *